(12) United States Patent
Masuda et al.

(10) Patent No.: US 9,333,953 B2
(45) Date of Patent: May 10, 2016

(54) ELECTRIC PARKING BRAKE SYSTEM

(71) Applicants: Yui Masuda, Shizuoka (JP); Makoto Muramatsu, Shizuoka (JP)

(72) Inventors: Yui Masuda, Shizuoka (JP); Makoto Muramatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/430,233

(22) PCT Filed: Oct. 10, 2013

(86) PCT No.: PCT/JP2013/077598
§ 371 (c)(1),
(2) Date: Mar. 23, 2015

(87) PCT Pub. No.: WO2014/058015
PCT Pub. Date: Apr. 17, 2014

(65) Prior Publication Data
US 2015/0246662 A1    Sep. 3, 2015

(30) Foreign Application Priority Data
Oct. 12, 2012  (JP) .................................. 2012-226702

(51) Int. Cl.
*G06F 7/70* (2006.01)
*B60T 7/12* (2006.01)
(Continued)

(52) U.S. Cl.
CPC . *B60T 7/12* (2013.01); *B60T 7/085* (2013.01); *B60T 7/107* (2013.01); *B60T 8/172* (2013.01);
(Continued)

(58) Field of Classification Search
CPC ........... B60T 7/12; B60T 7/085; B60T 7/107; B60T 8/172; B60T 13/741; F16D 65/18
See application file for complete search history.

(56) References Cited

U.S. PATENT DOCUMENTS 5,931,268 A * 8/1999 Kingston ............ F16D 65/0006
                                                188/158
6,000,507 A * 12/1999 Bohm ................... B60T 13/741
                                                188/1.11 E (Continued)

FOREIGN PATENT DOCUMENTS

EP    2 433 843     3/2012
JP    11-147458     6/1999
(Continued)

OTHER PUBLICATIONS

International Search Report issued Jan. 7, 2014 in International (PCT) Application No. PCT/JP2013/077598.
(Continued)

*Primary Examiner* — Calvin Cheung
(74) *Attorney, Agent, or Firm* — Wenderoth, Lind & Ponack, L.L.P.

(57) ABSTRACT

An electric parking brake system includes an electric motor; a linear motion mechanism that converts the rotational movement of a rotor shaft of the electric motor to a linear movement of a slide member to operate a brake; a locking mechanism that fixes a position of the slide member; a control device that controls the electric motor and the locking mechanism; a brake load estimation unit that estimates a brake force; and an electric parking brake operation instruction device that is arbitrary operable. The control device automatically executes a parking brake operation when a stop state of the vehicle is detected even if the electric parking brake operation instruction device is not operated. The automatically applied parking brake force is set to a value smaller than the normal parking brake force applied by the parking brake operation instruction device.

8 Claims, 5 Drawing Sheets

(51) Int. Cl.
  *B60T 7/08* (2006.01)
  *B60T 7/10* (2006.01)
  *B60T 13/74* (2006.01)
  *F16D 65/18* (2006.01)
  *B60T 8/172* (2006.01)
  *F16D 121/24* (2012.01)
  *F16D 125/40* (2012.01)
  *F16D 125/48* (2012.01)
  *F16D 125/50* (2012.01)

(52) U.S. Cl.
  CPC .............. *B60T 13/741* (2013.01); *F16D 65/18* (2013.01); *F16D 2121/24* (2013.01); *F16D 2125/40* (2013.01); *F16D 2125/48* (2013.01); *F16D 2125/50* (2013.01)

(56) References Cited

U.S. PATENT DOCUMENTS

| | | | | |
|---|---|---|---|---|
| 6,412,610 | B1* | 7/2002 | Drennen | F16D 55/227 188/156 |
| 9,180,844 | B2* | 11/2015 | Murata | B60T 7/12 |
| 2004/0040799 | A1* | 3/2004 | Schumann | B60T 7/107 188/158 |
| 2004/0104618 | A1* | 6/2004 | Yamamoto | B60T 7/042 303/20 |
| 2005/0173206 | A1* | 8/2005 | Reuter | F16D 65/18 188/72.7 |
| 2007/0062764 | A1* | 3/2007 | Takahashi | B60T 13/746 188/1.11 E |
| 2007/0261926 | A1* | 11/2007 | Dalton | B60T 13/746 188/72.8 |
| 2008/0059023 | A1* | 3/2008 | Ueno | B60T 1/10 701/36 |
| 2008/0110704 | A1* | 5/2008 | Nakazeki | F16D 65/18 188/158 |
| 2009/0218179 | A1* | 9/2009 | Yokoyama | B60T 13/741 188/1.11 L |
| 2010/0084230 | A1* | 4/2010 | Yamasaki | F16D 65/18 188/162 |
| 2011/0247904 | A1 | 10/2011 | Yamasaki | |
| 2012/0046844 | A1 | 2/2012 | Okada et al. | |
| 2013/0186717 | A1 | 7/2013 | Muramatsu et al. | |

FOREIGN PATENT DOCUMENTS

| | | |
|---|---|---|
| JP | 2006-183809 | 7/2006 |
| JP | 2007-015602 | 1/2007 |
| JP | 2010-065777 | 3/2010 |
| JP | 2010-090959 | 4/2010 |
| JP | 2010-269671 | 12/2010 |
| JP | 2012-087889 | 5/2012 |

OTHER PUBLICATIONS

Written Opinion of the International Searching Authority issued Jan. 7, 2014 in International (PCT) Application No. PCT/JP2013/077598 (with English translation).

\* cited by examiner

ELECTRIC PARKING BRAKE SYSTEM

TECHNICAL FIELD

The present invention relates to an electric linear motion actuator that linearly drives a driven member such as a brake pad, and an electric brake system that uses the electric linear motion actuator.

BACKGROUND ART

In an electric linear motion actuator having an electric motor as a drive source, the rotational movement of a rotor shaft of the electric motor is converted to a linear movement of an axially movable driven member by a motion converting mechanism.

A ball screw mechanism and a ball ramp mechanism are known for the motion converting mechanism adopted in the electric linear motion actuator. Although such motion converting mechanism has a force multiplying function to a certain extent, a large force multiplying function required in the electric disc brake system, and the like cannot be ensured.

Thus, in the electric linear motion actuator adopting the motion converting mechanism described above, the drive force is increased by separately incorporating a speed-reducing mechanism such as a planetary gear mechanism, whereby the configuration becomes complex and the electric linear motion actuator enlarges by the incorporation of the speed-reducing mechanism.

In order to solve such problems, the applicant of the present application has already proposed, in the below-identified patent document 1 and patent document 2, an electric linear motion actuator that can ensure a large force multiplying function without incorporating the speed-reducing mechanism and that is suited for use in the electric disc brake system in which a linear stroke is relatively small.

In the electric linear motion actuator described in patent document 1 and patent document 2, planetary rollers are mounted between a rotation shaft, which is rotation driven by an electric motor, and an axially movable outer ring member. When the rotation shaft is rotated, the planetary rollers are revolved while spinning by frictional contact with the rotation shaft, and the outer ring member is axially moved due to engagement of a helical rib formed on the radially inner surface of the outer ring member in a helical groove or circumferential grooves formed in the radially outer surface of each planetary roller.

In the electric disc brake system adopting the electric linear motion actuator described in patent document 1 and patent document 2, only a service brake function that controls the braking force in accordance with the operation of the brake pedal of the driver is provided, and hence the electric motor needs to be kept energized to maintain the braking force at the time of parking, which is extremely disadvantageous in terms of power consumption.

A great effect can be obtained in resolving the disadvantages described above by adding a parking brake locking mechanism by a solenoid and regulating the rotation of the rotor of the electric motor in the brake-releasing direction by the actuation of the parking brake locking mechanism as in an electric brake system described in patent document 3.

However, in the electric brake system described in patent document 3, although the parking brake locking mechanism is arranged, such parking brake locking mechanism is arranged at a periphery of the rotor and hence the radial dimension becomes large and the parking brake locking mechanism may interfere with the wheel when assembled to a vehicle. Furthermore, since the parking brake locking mechanism is arranged at the periphery of the rotor, the weight on the electric motor side becomes heavy thus causing the weight balance to degrade. Such degradation in the weight balance adversely affects the contact of the brake pad at the time of braking, whereby the braking becomes unstable and a brake noise may generate.

The electric brake system described in patent document 4, a locking mechanism for locking and unlocking the rotation of the rotor shaft of the electric motor includes a plurality of locking portions arranged in the circumferential direction of a side surface of one of a plurality of gears forming a gear reduction mechanism, a locking pin that can move forward and backward with respect to the locking portions, and a pin driving actuator that moves the locking pin forward and backward. The locking pin and the pin driving actuator are incorporated between the electric motor and a housing that houses a slide member and a rotation/linear movement converting mechanism, whereby the electric disc brake system that is small and compact and that excels in weight balance is realized.

PRIOR ART REFERENCES

Patent Documents

Patent document 1: Japanese Laid-Open Patent Publication No. 2010-65777
Patent document 2: Japanese Laid-Open Patent Publication No. 2010-90959
Patent document 3: Japanese Laid-Open Patent Publication No. 2006-183809
Patent document 4: Japanese Laid-Open Patent Publication No. 2012-087889

DISCLOSURE OF THE INVENTION

Problems to be Solved by the Invention

In an electronically controllable electric parking brake system of the brake-by-wire configuration, in which the brake pedal is connected to the actuator by an electric cable (wire) by way of a computer, and a friction brake is actuated by the actuator, if this system is configured such that parking brake can be automatically applied, it is unnecessary to keep depressing the brake pedal while the vehicle is at a stop. Also, if such a parking brake system is used to assist in e.g. hill start, it will improve safety of the vehicle.

Moreover, when driving the service brake (regular brake) with the electric motor, it is also effective to utilize the operation of the electric parking brake system as a measure for reducing the loss by the motor current when continuously exerting the brake force.

When actively performing the control of the electric parking brake system, however, a rapid lock-and-release operation of the parking brake is necessary to prevent the vehicle driver from feeling a sense of discomfort.

This is because the braking force used in the normal parking brake is generally the same as or greater than the maximum braking force of the service brake, and thus the response speed of the parking brake operation (lock-and-release operation) by such parking brake system tends to be slow. In other words, such electric parking brake operation can hardly be used for purposes other than for normal parking brake operation initiated by the driver.

Furthermore, if the braking force of the normal parking brake is repeatedly used, the demand for durability on the component parts of the brake may become high, which may result in increased cost and weight.

It is an object of the present invention to extend the application range of the parking brake operation by the electric parking brake system.

Means for Solving the Problems

In order to solve the problem described above, according to the present invention, the electric parking brake system is controlled such that parking brake operation is carried out automatically without depending on the operation of a vehicle driver when the vehicle is brought to a stop, and the parking brake force generated by the parking brake operation is close to the braking force of the service brake (regular brake) used for stopping the vehicle.

In a specific arrangement, the present invention provides an electric parking brake system comprising: an electric motor; a linear motion mechanism that converts the rotational movement of the rotor shaft of the electric motor to a linear movement of a slide member to operate a brake; a locking mechanism that fixes the position of the slide member; a control device that controls the electric motor and the locking mechanism; a brake load estimation means that estimates the actually acting braking force; and an electric parking brake operation instruction device that is arbitrary operable; wherein the control device automatically executes a parking brake operation when a stop state of the vehicle is detected even if the electric parking brake operation instruction device is not operated; and an automatically applied parking brake force at the time of the parking brake operation executed when the stop state is detected is set to a value smaller than a normal parking brake force at the time of normal parking brake operation by the operation of the parking brake operation instruction device.

With this arrangement, since the control device controls the electric parking brake system such that the parking brake force is close to. and thus not very different from, the service brake force used for stopping the vehicle, it is possible to minimize the duration of the parking brake operation, so that the vehicle driver does not feel a sense of discomfort. The parking brake operation by the electric parking brake system thus can be used as a brake assist application in more situations other than the normal parking brake, and the application range can be expanded.

This control device may further include an automatically applied braking force determination means that determines the automatically applied parking brake force, in which the automatically applied braking force determination means is configured to determine the automatically applied parking brake force so as to be equal to the braking force by the service brake estimated by the brake load estimation means when the stop state of the vehicle is detected.

By using the estimated value of the brake load estimation means so that there will not be so large a difference between the braking force by the service brake when the vehicle is brought to a stop and the braking force of the automatically operated parking brake operation, it is possible to more accurately set the automatically applied parking brake force.

The brake load estimation means are only required to be capable of detecting and estimating, by one of various methods, the brake load acting between members on which a braking frictional force actually acts due to the linear movement of the slide member, such as between the brake disc and the brake pad. The brake load estimation means may be means for detecting the distortion amount of e.g. the caliper body when the brake is operated, means for detecting a change amount of an electrical resistance between electrodes, means for detecting a piston load by the brake with various types of sensors, means for detecting a front-back force generated in the vehicle (action torque corresponding to the movement in the front and back direction of the vehicle) with a torque sensor, or the like.

This control device may further comprise an inclination angle detection means that detects an inclination angle of the vehicle in a front and back direction of the vehicle while the vehicle is at a stop, and a frictional force estimation means that estimates a frictional force of the brake by the service brake while the vehicle is at a stop; and the automatically applied braking force determination means may be configured to calculate an estimated value of a braking force necessary for maintaining the stop state of the vehicle from the inclination angle obtained by the inclination angle detection means and the frictional force obtained by the frictional force estimation means, and determine the automatically applied parking brake force from the estimated value. The frictional force estimation means is only required to be capable of detecting and estimating the frictional force (frictional force acting on the contacting portion of the brake pad and the disc, etc.) of the brake by the service brake at the time of stopping, and, for example, may be similar in structure to the brake load estimation means described above.

By calculating the estimated value of the brake force necessary for maintaining the stop state of the vehicle based on the inclination angle of the vehicle and the frictional force, it is possible to reliably prevent the vehicle from going down a hill under gravity against the will of the driver.

In each configuration described above, the control device may be configured to stop the power supply to the electric motor when the parking brake operation executed when the stop state of the vehicle is detected is completed.

The vehicle is stopped by the parking brake operation at the time of vehicle stop, so that the current flow to the electric motor for operating the normal service brake does not need to be continued. Therefore, the current flow is stopped after the parking brake operation thus reducing the energy consumption.

In each configuration described above, the control device can adopt a configuration of releasing the parking brake operation when a pedaling force on a brake pedal becomes smaller than a threshold value determined in advance. Alternatively, the control device can adopt a configuration of releasing the parking brake operation when a differential value of the pedaling force on the brake pedal becomes smaller than a threshold value determined in advance.

According to such configuration, the parking brake is automatically released when a reduction amount of the pedaling force of the vehicle driver becomes greater than a threshold value, so that the parking brake can be released without giving a sense of discomfort to the vehicle driver.

If the brake release may possibly cause the vehicle to move backward such as when starting on an uphill, the release of the parking brake may be delayed to prevent such backward movement of the vehicle.

In such configuration, the control device includes a driving force detection means that detects a driving force acting on a drive wheel of the vehicle; and the control device is configured to calculate a necessary driving force necessary to prevent the vehicle from at least not moving backward, from the inclination angle obtained by the inclination angle detection means, the drive force obtained by the drive force detection means, and the information on the weight of the vehicle, when the vehicle is inclined such that gravity acts on the vehicle in an opposite direction with respect to the advancing direction of the vehicle, and set a delay time for delaying the release of the parking brake operation until the driving force reaches the above necessary driving force.

The locking mechanism is only required to be capable of fixing the slide member, which is configured to be moved linearly by the rotation/linear movement converting mechanism, at a predetermined position in the forward/backward movement direction, and may be configured to directly make contact with the slide member to fix the slide member or indirectly fix the slide member. For example, the following electric parking brake system includes a locking mechanism that indirectly fixes the slide member.

An electric parking brake system further comprising a gear reduction mechanism provided between the electric motor and the linear motion mechanism and configured to reduce the speed of, and output, the rotation of the rotor shaft of the electric motor; wherein the locking mechanism comprises a locking portion provided on a side surface of one of a plurality of gears forming the gear reduction mechanism, a locking pin configured to be moved forward and backward with respect to the locking portion and brought into engagement with the locking portion to lock the rotation of the gears when the locking pin is moved forward, and a pin driving actuator configured to move the locking pin forward and backward; and the position of the slide member is fixed and the fixing is released by the locking and unlocking of the gears by the locking pin.

An electric brake system including the electric parking brake system having one of the configurations described above may be adopted, where the operation of the service brake by the operation of the brake pedal is executed by the functions of the electric motor, the rotation/linear movement converting mechanism, the control device, and the brake load estimation means.

The brake system that uses the electric parking brake system having each configuration described, and that can use the electric parking brake system for the brake assist application even in the situation of the service brake other than the normal parking brake can be realized.

One electric parking brake system and electric brake system having each configuration described above merely needs to be mounted on one automobile, but two or more may be mounted. Furthermore, such devices may be adopted for each brake of all the wheels.

In the present invention, the control device controls the electric parking brake system so as to become a brake force close to the service brake force used for stopping, that is, so that a great variation does not occur in the brake force, whereby the operation time of the parking brake becomes a minimum and the vehicle driver does not feel a sense of discomfort. The parking brake operation by the electric parking brake system thus can be used for the brake assist application in more situations other than the normal parking brake, and the application range can be expanded.

MODE FOR CARRYING OUT THE INVENTION

Hereinafter, an embodiment of the present invention will be described based on the drawings. This embodiment is directed to an electric parking brake system that uses an electric linear motion actuator A as a linear motion mechanism A for linearly driving brake pads P with respect to a brake disc D, and an electric brake system E equipped with the electric parking brake system.

Figure 3:
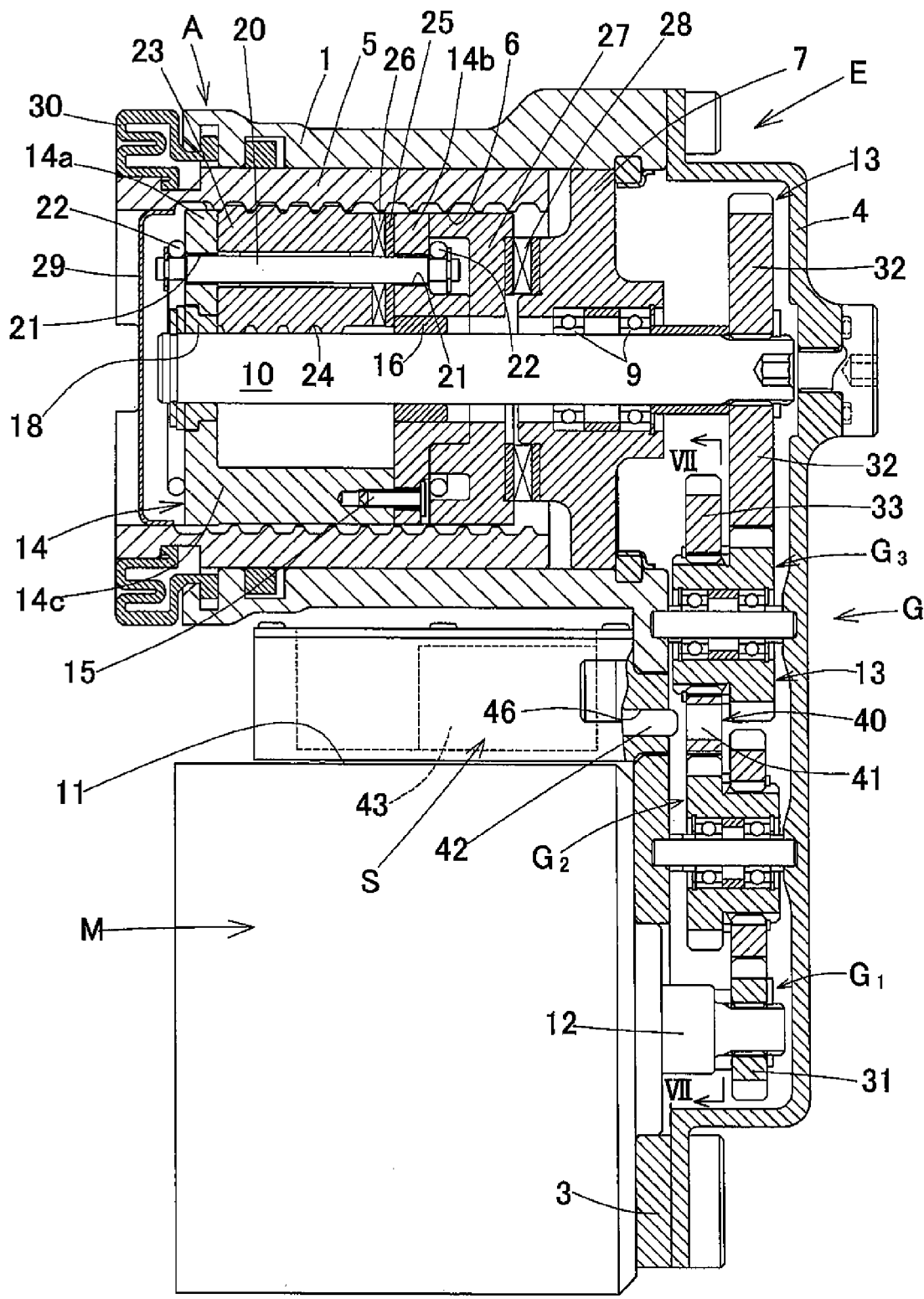
FIG. 3 is a longitudinal sectional view of the electric parking brake system and the electric brake system.
Figure 4:
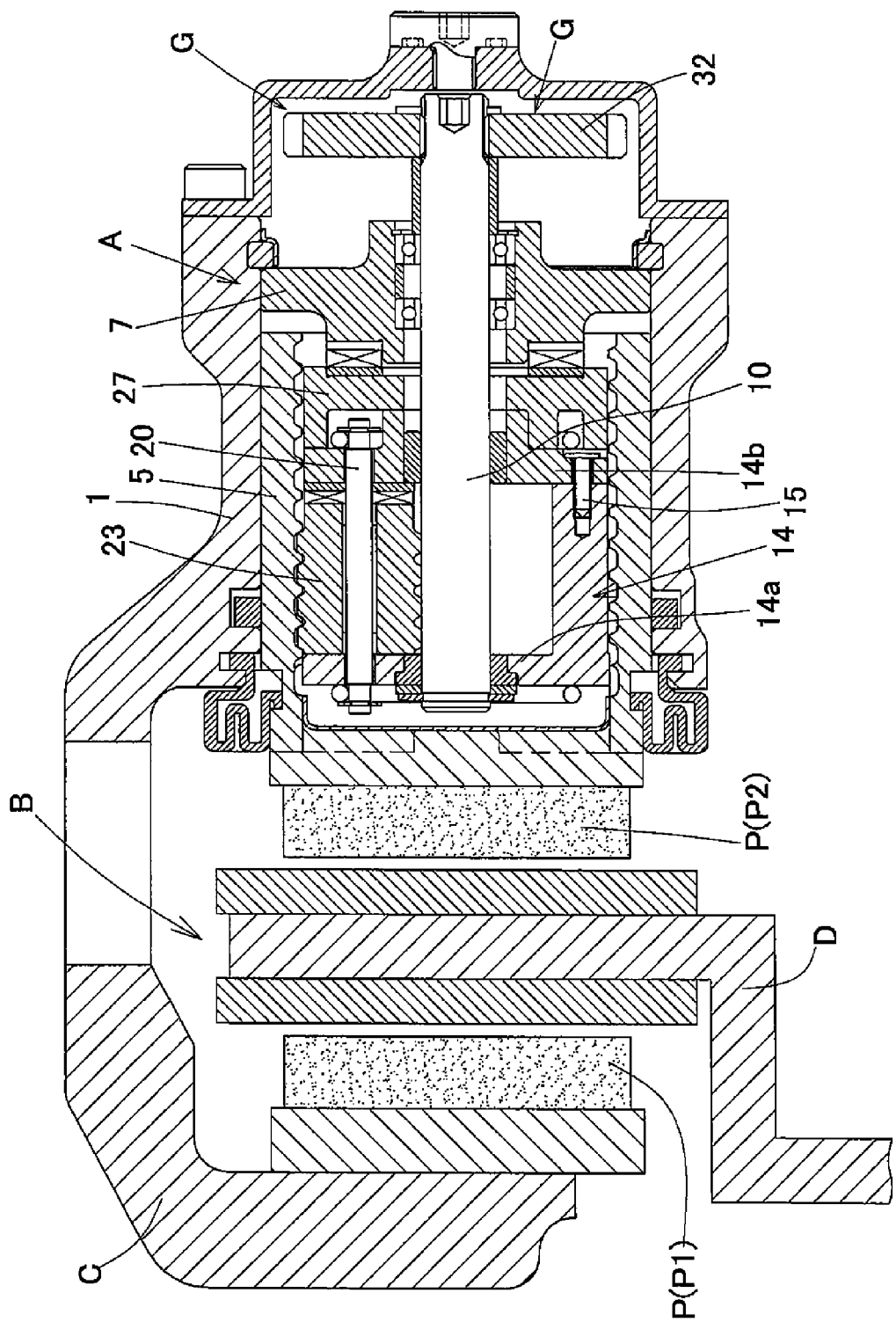
FIG. 4 is a sectional view showing in an enlarged manner a linear motion mechanism and the brake system of FIG. 3.

As shown in FIGS. 3 and 4, the electric linear motion actuator A and an electric motor M for actuating the electric linear motion actuator A are arranged in parallel to each other. The rotation force from the electric motor M is transmitted to the electric linear motion actuator A by way of a gear reduction mechanism G, and the electric linear motion actuator A presses the brake pads P of the electric brake system E against the brake disc D to generate a braking force.

In particular, the electric linear motion actuator A converts the rotational movement of a rotor shaft 12 of the electric motor M to a linear movement of a slide member 5, thus pressing the pads P against the disc D to generate a braking force by the linear movement of the slide member 5.

The electric linear motion actuator A is mounted in a cylindrical housing 1. A base plate 3 extends radially outwardly from a first end of the housing 1. The outer side surface of the base plate 3 and the opening of the housing 1 at the first end are covered with a cover 4.

The slide member 5, in the form of an outer ring member 5, is mounted in the housing 1. The outer ring member 5 is rotationally fixed and is movable in the axial direction along the radially inner surface of the housing 1. The outer ring member 5 has, on its radially inner surface, a helical rib 6 having a V-shaped section.

A bearing member 7 is mounted in the housing 1 at a first axial end side of the outer ring member 5. Two rolling bearings 9 are mounted in the bearing member 7 so as to be axially spaced apart from each other. A rotation shaft 10 arranged on the axis of the outer ring member 5 is rotatably supported by the rolling bearings 9.

As shown in FIG. 3, the electric motor M is supported by the base plate 3 by way of a motor housing 11, and the rotation of the rotor shaft 12 of the electric motor M is transmitted to the rotation shaft 10 by the gear reduction mechanism G incorporated in the cover 4.

A carrier 14 is mounted in the outer ring member 5 so as to be rotatable about the rotation shaft 10. As shown in FIG. 4, the carrier 14 includes a pair of discs 14a, 14b that face each other in the axial direction. The disk 14a has, on the outer peripheral portion of its side surface facing the disk 14b, a plurality of interval adjusting members 14 which are circumferentially spaced apart from each other and extend toward the other disc 14b. The discs 14a, 14b are coupled to each other by tightening screws 15 screwed into the end faces of the interval adjusting members 14c.

Of the discs 14a and 14b, the inboard side disc positioned on the side of the bearing member 7, namely the disc 14b, is rotatably and axially movably supported by a slide bearing 16 incorporated between the disc 14b and the rotation shaft 10. The outboard disc 14a is supported by a slide bearing 18 so as to be rotatable relative to the rotation shaft 10.

The carrier 14 is provided with a plurality of circumferentially spaced apart roller shafts 20 each having their ends supported by the respective discs 14a, 14b. Each roller shaft 20 has its respective end portions inserted in shaft inserting holes 21 in the form of elongated holes formed in the respective discs 14a and 14b so as to be movable in the radial direction. The roller shafts 20 are biased radially inwardly by two elastic rings 22 each wrapped around the first or second ends of the roller shafts 20.

A planetary roller 23 is rotatably supported by each of the roller shafts 20. The planetary rollers 23 are arranged between the radially outer surface of the rotation shaft 10 and the radially inner surface of the outer ring member 5, and are pressed against (and thus brought into elastic contact with) the radially outer surface of the rotation shaft 10 under the biasing force of the elastic rings 22 wrapped around the shaft end portions of the roller shafts 20. Thus, when the rotation shaft 10 is rotated, the planetary rollers 23 are rotated due to frictional contact with the radially outer surface of the rotation shaft 10.

As shown in FIG. 3, each of the planetary rollers 23 is formed, in the radially outer surface thereof, with a plurality of axially equidistantly spaced apart helical grooves 24 having a V-shaped section. The pitch of the helical grooves 24 is equal to the pitch of the helical rib 6 formed on the outer ring member 5, and the helical rib 6 is engaged in the helical grooves 24. However, instead of the helical grooves 24, each planetary roller 23 may be formed with a plurality of axially equidistantly spaced apart circumferential grooves, with the same pitch as the helical rib 6.

A washer 25 and a thrust bearing 26 are incorporated axially between the inboard side disc 14b of the carrier 14 and each of the planetary rollers 23. Furthermore, an annular thrust plate 27 is disposed axially between the carrier 14 and the bearing member 7, and a thrust bearing 28 is incorporated axially between the thrust plate 27 and the bearing member 7. The opening of the outer ring member 5 at the second end thereof, which is positioned outside of the opening of the housing 1 at the second end thereof, is closed by a seal cover 29 thus preventing entry of foreign substances.

Furthermore, a bellows 30 has one end portion thereof coupled to the opening of the housing 1 at the second end, and the other end portion thereof coupled to the second end portion of the outer ring member 5, thereby preventing entry of foreign substances into the housing 1.

As shown in FIG. 3, the gear reduction mechanism G transmits the rotation of an input gear 31 attached to the rotor shaft 12 of the electric motor M to an output gear 32 attached to the shaft end portion of the rotation shaft 10, after sequentially reducing its speed by means of primary to tertiary reduction gear trains $G_1$ to $G_3$, to rotate the rotation shat 10. The gear reduction mechanism G includes a locking mechanism 40 that can lock and unlock the rotor shaft 12 of the electric motor M.

The locking mechanism 40 has a plurality of locking holes (locking portions) 41 formed in a side surface of an intermediate gear 33 on the output side of the secondary reduction gear train $G_2$ so as to be arranged at equal intervals on a common circle. The locking mechanism 40 further includes a locking pin 42 movable forward and backward with respect to a point on the pitch circle of the locking holes 41, and a linear solenoid 43 as a pin driving actuator S for moving the locking pin 42 forward and backward, and is configured such that when the locking pin 42 is engaged in one of the locking holes 41 (as shown in FIGS. 5 and 6), the intermediate gear 33 is locked in position.

In this embodiment, the locking portions 41 are holes that extend through the intermediate gear 33, but the locking portions 41 are not limited thereto. For example, the locking portions 41 may be radial grooves defined between adjacent radial ribs formed on the side surface of the intermediate gear 33. Alternatively, the locking portions 41 may comprise recesses formed in the side surface of the intermediate gear 33.

FIG. 4 shows a brake unit B using the electric linear motion actuator A of the above-described embodiment. The brake unit B includes a caliper body unit C integrally connected to the second end of the housing 1 of the electric linear motion actuator A, and a fixed brake pad P1 and a movable brake pad P2 disposed on the front and back sides, respectively, of the outer peripheral portion of the brake disc D that are located in the caliper body unit C. The movable brake pad P2 is integrally coupled to the second end portion of the outer ring member 5.

Figure 5:
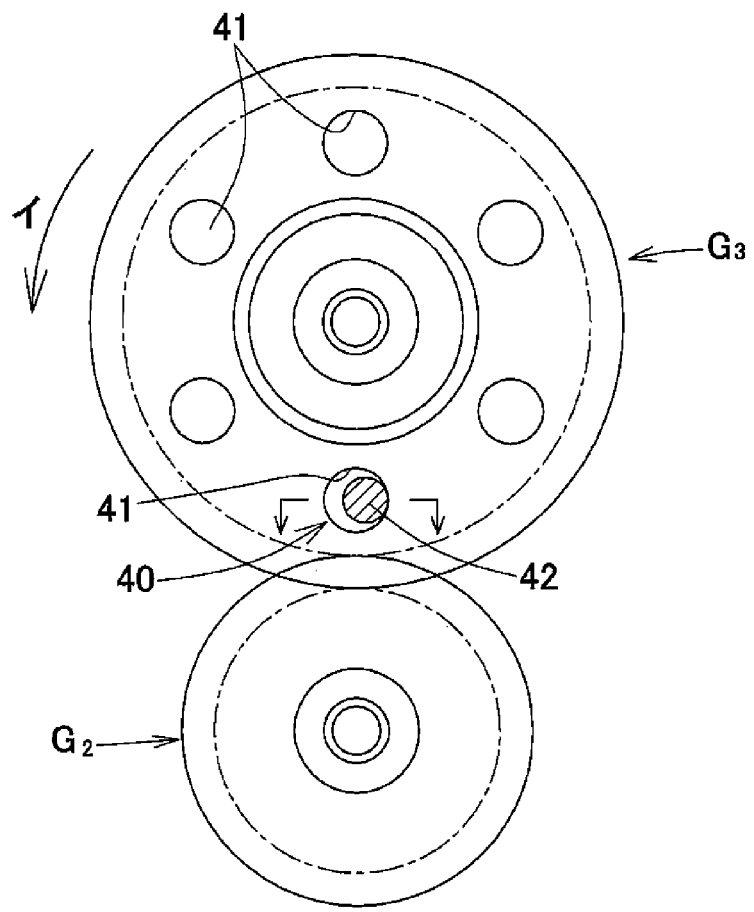
FIG. 5 is a sectional view taken along line VII-VII of FIG. 3.
Figure 6:
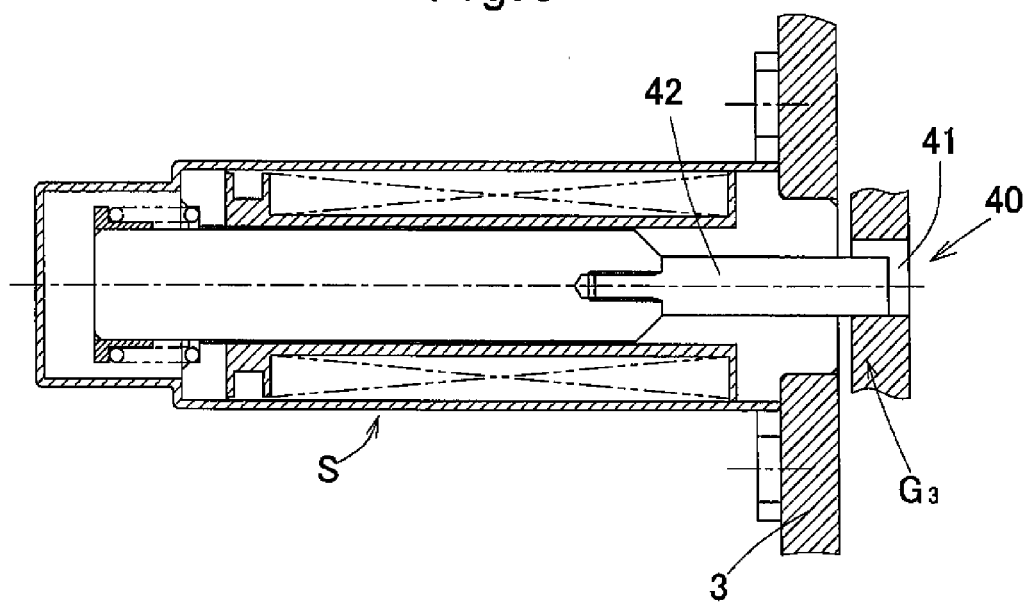
FIG. 6 is a sectional view of a linear solenoid.

In this brake unit B, in which the electric linear motion actuator A is used, when the electric motor M, shown in FIG. 5, is driven, the rotation of the rotor shaft 12 of the electric motor M is transmitted to the rotation shaft 10 after its speed has been reduced by the gear reduction mechanism G.

Since the respective radially outer surfaces of the planetary rollers 23 are in elastic contact with the radially outer surface of the rotation shaft 10, when the rotation shaft 10 rotates, the planetary rollers 23 rotate about their respective axes while revolving around the rotation shaft 10, due to frictional contact with the rotation shaft 10.

This causes the outer ring member 5 to be moved axially due to engagement of the helical rib 6, which is formed on the radially inner surface of the outer ring member 5, in the helical grooves 24 formed in the radially outer surfaces of the planetary rollers 23, which in turn causes the movable brake pad P2, which is integrally coupled to the outer ring member 5, to be pressed against the brake disc D, thus applying a braking force to the brake disc D.

In parking the vehicle, the linear solenoid 43 is actuated to move the locking pin 42 forward toward the side surface of the intermediate gear 33, with the movable brake pad P2 pressed against the brake disc D and a braking force necessary for parking applied to the brake disc D, as described above.

If one of the plurality of locking holes 41 faces the locking pin 42 when the locking pin 42 is moved forward, the locking pin 42 engages in this locking hole 41 and the intermediate gear 33 is locked by such engagement, as shown in FIGS. 5 and 6. At this time, since the rotor shaft 12 of the electric motor M is also locked, the electric motor M can be kept de-energized, so that it is possible to reduce energy consumption.

If the locking pin 42 faces none of the locking holes 41 when the locking pin 42 is moved forward, the locking pin 42 cannot be engaged in any of the locking holes 41. In this case, the intermediate gear 33 is rotated in the braking direction (direction indicated by arrow A in FIG. 5) by driving the electric motor M with the locking pin 42 moved forward, until the intermediate gear 33 is rotated to a position where one of the locking holes 41 faces the locking pin 42 thus engaging the locking pin 42 in the locking hole 41.

With the intermediate gear 33 and thus the rotor shaft 12 of the electric motor M both locked in position due to engagement of the locking pin 42 in one of the locking holes 41, rotation force in the brake releasing direction is applied to the respective gears of the gear reduction mechanism G by the reaction force from the brake disc D, so that a rotation torque is applied to the engagement portions of the locking hole 41 and the locking pin 42. Such rotation torque is large at the position of the output gear 32 and gradually becomes smaller toward the input gear 31.

In the embodiment, the locking holes 41 are formed in the side surface of the intermediate gear 33, which is on the output side of the secondary reduction gear train $G_2$, so that rotation torque applied to the engagement portions of the lock hole 41 and the locking pin 42 is relatively small and the engagement portions of the lock hole 41 and the locking pin 42 will not be damaged.

In order to more effectively prevent such damage, the locking holes 41 are preferably formed in the intermediate gear proximate to the input gear 31. The position of the locking pin 42 is determined in accordance with the positions of the locking holes 41.

Figure 2:
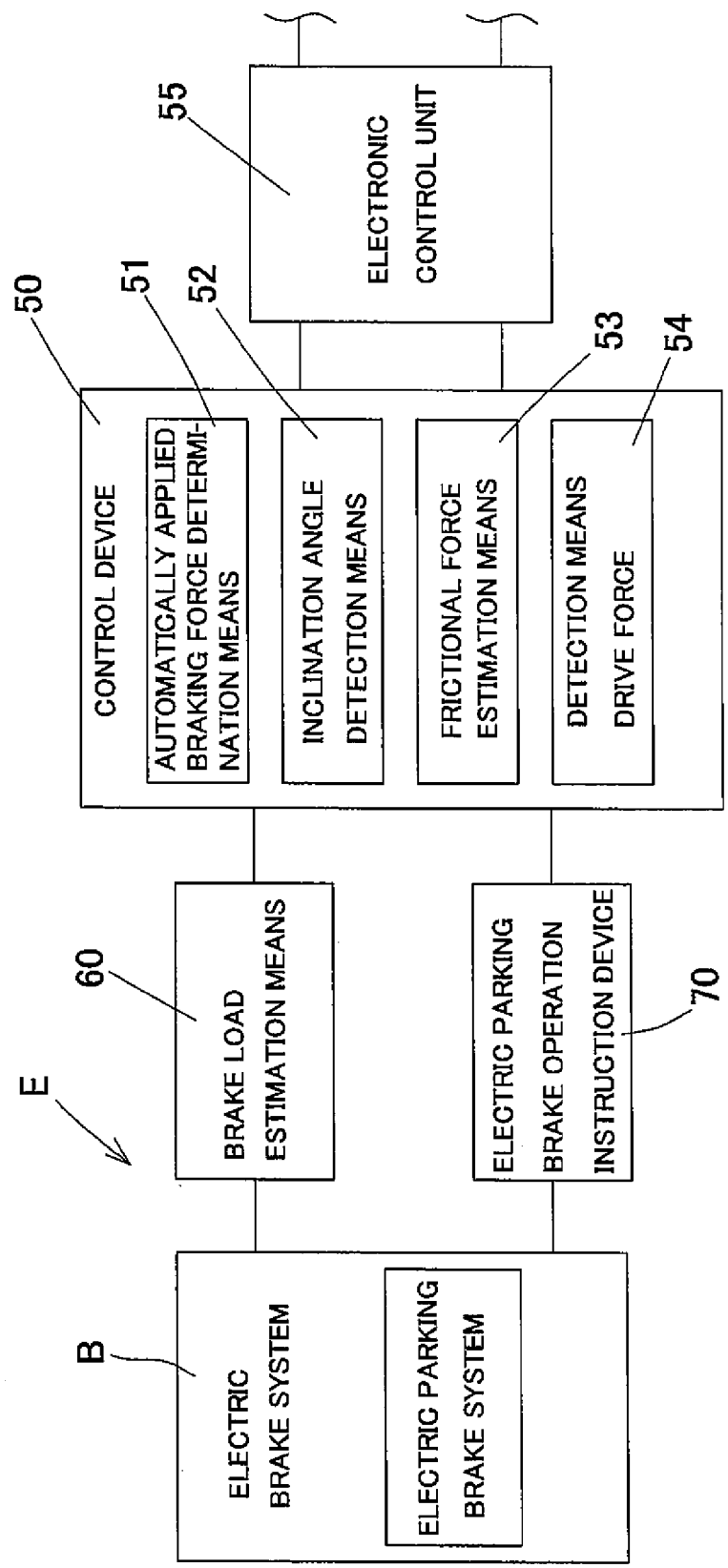
FIG. 2 is a system configuration diagram of the electric parking brake system and the electric brake system.

As shown in FIG. 2, the electric brake system E includes a control device 50 for controlling the electric motor M and the locking mechanism 40. The control device 50 is controlled by an electronic control unit (ECU) 55.

Furthermore, the electric brake system E includes a brake load estimation means 60 that estimates the actually acting brake force, and an electric parking brake operation instruction device 70 that can be arbitrary operated by the will of the vehicle driver. When the vehicle driver operates the electric parking brake operation instruction device 70, the parking brake operation is carried out.

The parking brake is applied when the locking pin 42 is engaged in one of the locking holes 41, thereby preventing axial movement of the outer ring member 5, and thus axially fixing the outer ring member 5 in position, with a predetermined braking force being exerted between the brake pad P and the brake disc D. Once the parking brake is applied, the electric motor M is de-energized.

A normal parking brake force Fmax while normal parking brake is applied by the operation of the parking brake operation instruction device 70 is generally set to a value greater than a braking force $F_0$ of the service brake while the vehicle is at a stop. The parking brake operation instruction device 70 generates the normal parking brake force Fmax between the brake pad P and the brake disc D by driving the electric motor M, before the outer ring member 5 is completely fixed in position by the locking mechanism 40.

Figure 1:
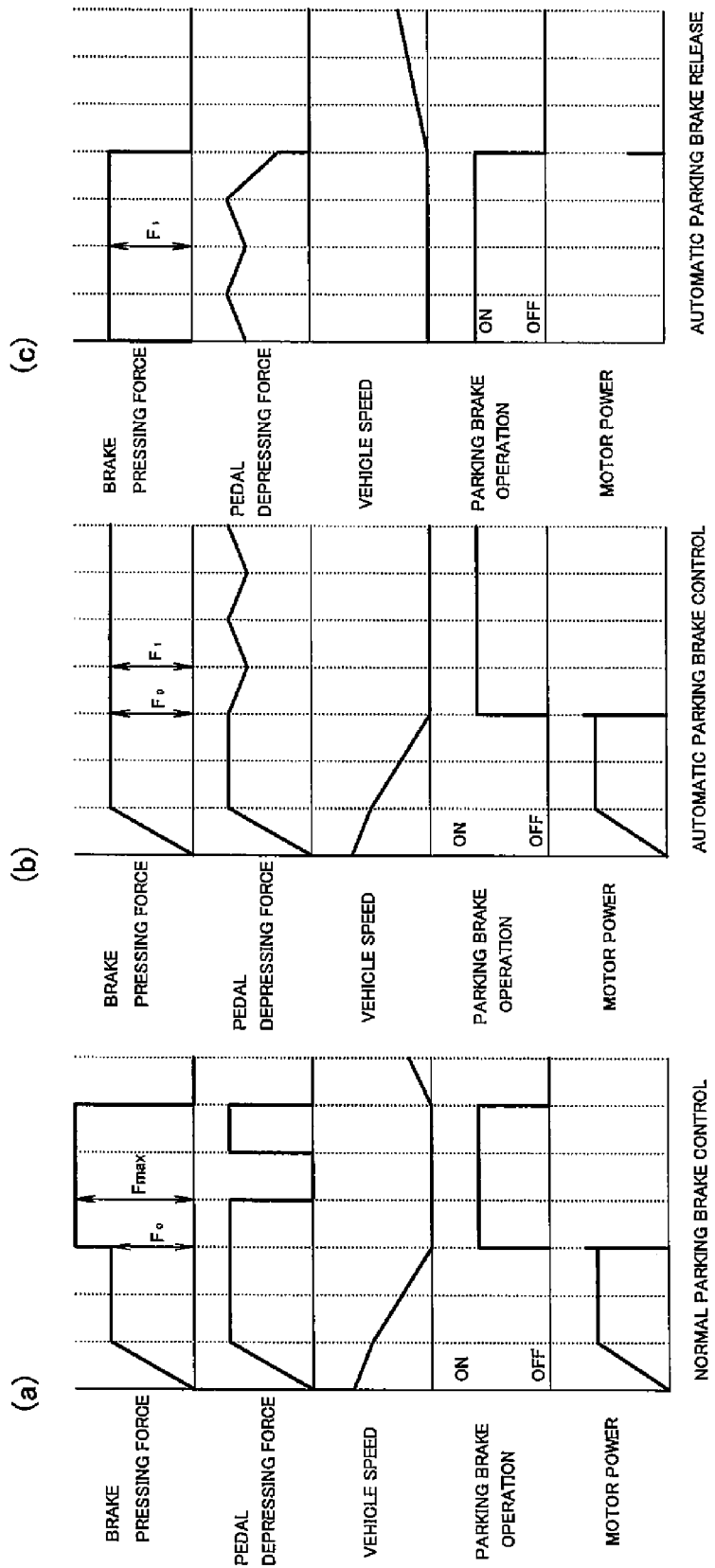
FIG. 1 is an explanatory view of an operation of an electric parking brake system and an electric brake system according to one embodiment of the present invention.

FIG. 1(a) schematically shows the normal parking brake operation by the operation of the parking brake operation instruction device 70. In particular, the graph at the uppermost level of FIG. 1(a) shows the relationship between the braking force $F_0$ of the service brake and the normal parking brake force Fmax; the graph at the second level shows the pedal depressing force; the graph at the third level shows the vehicle speed; the graph at the fourth level shows on and off of the operation of the parking brake operation instruction device 70; and the graph at the fifth level shows the power consumption of the electric motor M. As shown, when the parking brake is actuated, the brake pressing force is held by the mechanical locking mechanism (locking mechanism 40), and the motor power becomes zero, so that the brake pressing force basically does not follow the pedal depressing force.

The control device 50 has a function of automatically executing the parking brake operation when it is detected that the vehicle is at a stop, even if the electric parking brake operation instruction device 70 is not operated in this state. That the vehicle is at a stop is detected through the speedometer and/or information on the rotation of the drive wheels.

This automatic parking brake operation is also performed through the engagement of the locking pin 42 and one of the locking holes 41 by the locking mechanism 40, with a predetermined braking force necessary to stop the vehicle exerted between the brake pad P and the brake disc D.

The automatically applied parking brake force $F_1$ during automatic parking brake operation is set to a value equal to or substantially equal to the braking force $F_0$ of the service brake while the vehicle is at a stop. The control device 50 generates the automatically applied parking brake force $F_1$ between the brake pad P and the brake disc D by driving the electric motor M before the outer ring member 5 is completely fixed in position by the locking mechanism 40.

FIG. 1(b) schematically shows the automatically performed parking brake operation, which does not depend on the operation of the parking brake operation instruction device 70. In particular, the graph at the uppermost level of FIG. 1(b) shows the relationship between the braking force $F_0$ of the service brake and the automatically applied parking brake force $F_1$, which is equal to the braking force $F_0$; and similar to FIG. 1(a), the graphs at the second to fifth levels of FIG. 1(b) show the pedal depressing force, the vehicle speed, on and off of the operation of the parking brake operation instruction device 70, and the power consumption of the electric motor M, respectively.

In FIG. 1(b), the electric parking brake system is controlled to generate braking force (automatically applied parking brake force $F_1$) equal to the braking force $F_0$ when the vehicle is brought to a stop (vehicle speed zero) after the vehicle driver has applied brakes while the vehicle is traveling. While the parking brake is applied, the power supply to the electric motor M is stopped.

As can be understood from the comparison of FIG. 1(a) and FIG. 1(b), the automatically applied parking brake force $F_1$ at the time of the parking brake operation executed when the stop state of the vehicle is detected is set to a value smaller than the normal parking brake force Fmax at the time of the normal parking brake operation by the operation of the parking brake operation instruction device 70. The braking force $F_0$ of the service brake and the automatically applied parking brake force $F_1$ are set to be equal to or substantially equal to each other.

The control device 50 thus controls the electric parking brake system so that there is no big difference between the braking force of the service brake used to stop the vehicle and the braking force applied during automatic parking brake operation.

As a result, it is possible to minimize the duration of the parking brake operation, and the vehicle driver will not feel a sense of discomfort. The parking brake operation by the electric parking brake system thus can be used in a wider range of brake assist applications other than the normal parking brake, and the application range thereof can be expanded.

The automatically applied parking brake force $F_1$ is set by the control device 50. The control device 50 includes an automatically applied braking force determination means 51 that determines the automatically applied parking brake force $F_1$. The automatically applied braking force determination means 51 has a function of determining the automatically applied parking brake force $F_1$ so as to be equal to the braking force $F_0$ by the service brake estimated by the brake load estimation means 60 when the stop state of the vehicle is detected. The control device 50 carries out the parking brake operation based on such determination.

An estimated value of the brake load estimation means 60 is adopted so that a great variation does not occur between the braking force $F_0$ by the service when the vehicle is brought to a stop and the automatically applied parking brake force $F_1$ of the parking brake operation automatically operated thereafter, so that the automatically applied parking brake force can be more accurately set.

The control device 50 further includes an inclination angle detection means 52 that detects the inclination angle of the vehicle in the front and back direction of the vehicle while the vehicle is at a stop, and a frictional force estimation means 53 that estimates the frictional force between the friction pad and the brake rotor by the service brake while the vehicle is at a stop.

The automatically applied braking force determination means 51 calculates an estimated value of the brake force necessary for maintaining the stop state of the vehicle based on the inclination angle obtained by the inclination angle detection means 52 and the frictional force obtained by the frictional force estimation means 53, and determines the automatically applied parking brake force $F_1$ from the estimated value.

By calculating the estimated value of the brake force necessary for maintaining the stop state of the vehicle based on the inclination angle of the vehicle and the frictional force, it is possible to reliably prevent the vehicle from going down a slope under gravity against the will of the driver.

Similar to the normal parking brake operation, the control device 50 stops the power supply to the electric motor M when the parking brake operation automatically executed when the stop state of the vehicle is detected is completed. In other words, once the parking brake operation is complete, the electric motor M needs not to be kept energized, and thus can be de-energized, thus reducing energy consumption.

FIG. 1(c) schematically shows how the automatically executed parking brake operation is released. The parking brake is released when the value corresponding to the pedal depressing force becomes smaller than or greater than a predetermined threshold value.

For example, the control device 50 may be configured to release the parking brake operation when the absolute value of the pedal depressing force becomes smaller than the predetermined threshold value. Alternatively, the control device 50 may be configured to release the parking brake operation when the differential value of the pedal depressing force becomes smaller than the predetermined threshold value.

The control device 50 may further include a driving force detection means 54 that detects the driving force acting on the drive wheels of the vehicle. In this case, the control device 50 is configured to calculate a necessary drive force necessary to at least prevent the vehicle from moving backward, from the inclination angle obtained by the inclination angle detection means 52, the drive force obtained by the drive force detection means 54, and the information on the weight of the vehicle, when the vehicle is inclined such that gravity acts on the vehicle in a direction opposite to the advancing direction of the vehicle, and set a delay time for delaying the release of the parking brake operation until the driving force reaches the above necessary driving force. With this arrangement, it is possible to prevent backward movement of the vehicle during e.g. a hill start.

DESCRIPTION OF SYMBOLS

1 housing
5 outer ring member (slide member)
6 helical rib
10 rotation shaft
11 motor housing
12 rotor shaft
14 carrier
20 roller shaft
23 planetary roller
31 input gear
32 output gear
33 intermediate gear
40 locking mechanism
41 locking hole (locking portion)
42 locking pin
43 linear solenoid
50 control device
51 automatically applied brake force determination means
52 inclination angle detection means
53 frictional force estimation means
54 driving force detection means
60 brake load estimation means
70 electric parking brake operation instruction device
A electric linear motion actuator (linear motion mechanism)
B brake unit
C caliper body unit
D brake disc
E electric brake system (electric parking brake system)
$F_1$ automatically applied parking brake force
Fmax normal parking brake force
G gear reduction mechanism
M electric motor
P brake pad
P1 fixed brake pad
P2 movable brake pad
S pin driving actuator

The invention claimed is:

1. An electric parking brake system comprising:
   an electric motor;
   a linear motion mechanism that converts a rotational movement of a rotor shaft of the electric motor to a linear movement of a slide member to operate a brake;
   a locking mechanism that fixes a position of the slide member;
   a control device that controls the electric motor and the locking mechanism;
   a brake load estimation unit that estimates an actually acting braking force; and
   an electric parking brake operation instruction device that is arbitrary operable; wherein
   the control device automatically executes a parking brake operation when a stop state of the vehicle is detected even if the electric parking brake operation instruction device is not operated; and
   an automatically applied parking brake force at time of the parking brake operation executed when the stop state is detected is set to a value smaller than a normal parking brake force at time of normal parking brake operation by the operation of the parking brake operation instruction device.

2. The electric parking brake system according to claim 1, wherein the control device comprises an automatically applied braking force determination unit that determines the automatically applied parking brake force, the automatically applied braking force determination unit having a function of determining the automatically applied parking brake force so as to be equal to a braking force by a service brake estimated by the brake load estimation unit when the stop state of the vehicle is detected.

3. The electric parking brake system according to claim 2, wherein
   the control device further comprises an inclination angle detection unit that detects an inclination angle of the vehicle in a front and back direction of the vehicle while the vehicle is at a stop, and a frictional force estimation unit that estimates a frictional force of the brake by the service brake while the vehicle is at a stop; and
   the automatically applied braking force determination unit is configured to calculate an estimated value of a braking force necessary for maintaining a stop state of the vehicle from the inclination angle obtained by the inclination angle detection unit and the frictional force obtained by the frictional force estimation unit, and determine the automatically applied parking brake force from the estimated value.

4. The electric parking brake system according to claim 1, wherein the control device is configured to stop power supply to the electric motor when the parking brake operation executed when a stop state of the vehicle is detected is completed.

5. The electric parking brake system according to claim 1, wherein the control device is configured to release the parking brake operation when a depressing force applied to a brake pedal becomes smaller than a predetermined threshold value.

6. The electric parking brake system according to claim 1, wherein the parking brake operation is released when a differential value of a depressing force applied to a brake pedal becomes smaller than a predetermined threshold value.

7. The electric parking brake system according to claim 1, wherein
the control device comprises a driving force detection unit that detects a driving force acting on a drive wheel of the vehicle;
the control device is configured to calculate a necessary driving force necessary to prevent the vehicle from at least moving backward, from the inclination angle obtained by the inclination angle detection unit, the driving force obtained by the driving force detection unit, and information on a weight of the vehicle, when the vehicle is inclined such that gravity acts on the vehicle in an opposite direction with respect to an advancing direction of the vehicle, and set a delay time for delaying the release of the parking brake operation until the driving force reaches the necessary drive force.

8. The electric parking brake system according to claim 1, further comprising a gear reduction mechanism provided between the electric motor and the linear motion mechanism and configured to reduce the speed of, and output, the rotation of the rotor shaft of the electric motor; wherein
the locking mechanism comprises a locking portion provided on a side surface of one of a plurality of gears forming the gear reduction mechanism, a locking pin configured to be moved forward and backward with respect to the locking portion and brought into engagement with the locking portion to lock the rotation of the gears when the locking pin is moved forward, and a pin driving actuator configured to move the locking pin forward and backward; and
the position of the slide member is fixed and the fixing is released by the locking and unlocking of the gears by the locking pin.

* * * * *